United States Patent [19]

Blättler et al.

[11] 3,968,692

[45] July 13, 1976

[54] THERMOSTATIC EXPANSIBLE MATERIAL-WORKING ELEMENT

[75] Inventors: Ernst Blättler, Stafa; Werner Roner, Feldbach, both of Switzerland

[73] Assignee: Elektrowatt AG, Zurich, Switzerland

[22] Filed: Dec. 30, 1974

[21] Appl. No.: 537,395

[30] Foreign Application Priority Data

Jan. 11, 1974 Switzerland.......................... 327/74

[52] U.S. Cl................................ 73/363; 60/527; 73/368.3
[51] Int. Cl.².......................................... G01K 5/48
[58] Field of Search............... 73/368.2, 368.3, 363; 60/527, 528

[56] References Cited
UNITED STATES PATENTS 3,075,348  1/1963  Baker...................... 60/528
3,540,479  11/1970  Thompson.................. 60/527

*Primary Examiner*—S. Clement Swisher
*Attorney, Agent, or Firm*—Werner W. Kleeman

[57] ABSTRACT

A thermostatic expansible material-working element with a housing filled with the material and a pin-shaped work piston which is pointed at one end. The work piston with its pointed end extends through an opening in the housing into the internal compartment thereof and upon thermal expansion of the expansible material such piston is displaced out of the housing. According to the invention the expansible material is a molded body predominantly formed of polytetrafluoroethylene, polytrifluoroethylene or polytetrafluoroethyleneperfluoropropylene.

9 Claims, 1 Drawing Figure

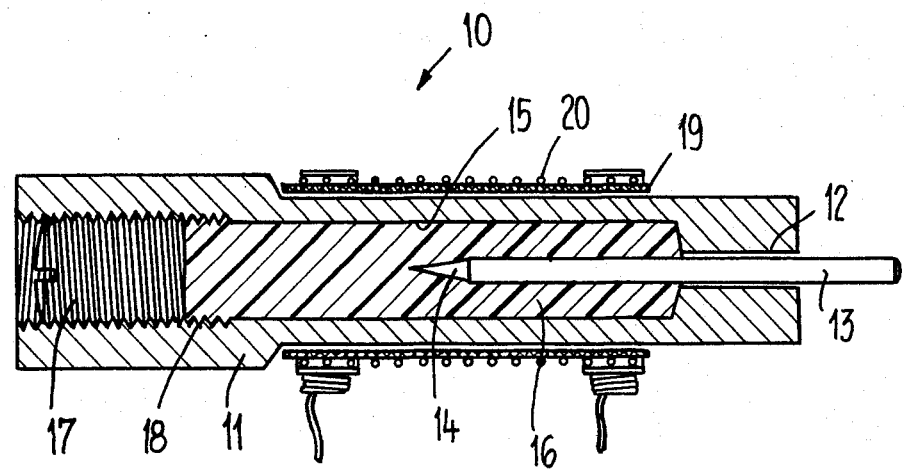

THERMOSTATIC EXPANSIBLE MATERIAL-WORKING ELEMENT

BACKGROUND OF THE INVENTION

The present invention relates to a new and improved construction of a thermostatic expansible material-working element having a housing filled with an expansible material or substance and a substantially pin-shaped work piston which is pointed at one end, this work piston extending with its pointed end through an opening in the housing into the internal compartment thereof and upon thermal expansion of the expansible material such piston is pushed by the expansible material out of the housing.

Such thermostatic expansible material-working elements are components which according to a temperature characteristic —dependent upon the selection of the expansible material or substance—produce at their work piston mechanically accessible adjustment forces, and for the size of the stroke in a certain temperature range between a response temperature and an upper boundary temperature there exists a well defined dependency.

Owing to their small space requirements and because of the relatively great force which such working elements are capable of producing such are to some extent installed as servo-motors in remotely controlled installations or, however, for the temperature-dependent actuation of valves are installed at or in such valves themselves.

The reliability of such work or working elements is only then guaranteed when and as long as the elements are free of leakage, i.e., as long as the quantity of expansible material which once has been filled into the housing remains constant. As the expansible material or substance there are generally used oils or waxes which exxperience an increase in volume during their transition from the solid phase into the liquid phase. The flowing-out or leakage of even only a fraction of the expansible material from the housing basically alters the temperature characteristic of the working element and in most instances renders the same unusable.

Therefore, the greatest attention has been paid to the problem of sealing the internal compartment or space of the housing relative to the surrounding external space in the case of all previously known working elements of the aforementioned type. However, it was not possible up to now to provide a seal which retained its sealing properties over an unlimited period of use of the working element. The susceptibility to aging of the heretofore known working elements resides in the fact that as the seal between the internal compartment of the housing and the piston, the latter of which extends into such internal compartment and of necessity also protrudes out of the housing, there were provided components formed of rubber-like substances. These substances are only resistant to aging to a limited extent, particularly because of the frequent temperature changes to which the working elements are of course subjected and for which they were designed. This has been amply proven by the heretofore known working elements of the previously mentioned type.

For instance for the working element which has been taught to the art in U.S. Pat. No. 3,403,560 the expansible material or substance is a wax, preferably a mineral wax. It fills the ring-shaped space between the inner wall of the housing and the outside of a sheath formed of rubber which tightly surrounds the pointed (inner) end of the work piston. The sheath or case itself possesses at its open end a marginal flange which is clamped between a shoulder of the housing and a flanged housing cover which also possesses the throughpassage opening for the work piston. In this construction the marginal flange serves as the seal.

Also in the thermostatic actuation element taught in the German Pat. No. 1,958,563 the throughpassage opening for the work piston is formed in the housing cover, which at the same time fixedly clamps at its outer edge a seal which encloses in a packing gland-like manner the work piston at least at the region of the passage through the opening.

The same holds true for the work element which has become known from the German Pat. No. 1,473,231, wherein not only the sheath which tightly encloses the work piston is formed of elastic material, rather also a circular cord seal which surrounds the piston at the region of the opening.

With the work element according to the German Pat. 1,573,384 the piston indeed engages directly into the expansible substance, but its throughpassage location out of the housing is sealed with a pre-biased seal in the manner of a stuffing-box or packing gland.

In all of the above-mentioned patent publications a particularly great significance has been attributed to the construction of the seal between the housing and the work piston at its throughpassage location. However, in practice it was not heretofore possible to provide a solution of the problem which was satisfactory over a longer time span, regardless whether there is employed a liquid or solid expansible substance, or such which in the working or operating range transform from the solid phase into the liquid phase or vice versa.

SUMMARY OF THE INVENTION

Now with this state-of-the-art in mind it is a concern of the invention to provide a work element of the previously mentioned type in which the aforementioned problems are extensively solved in a different manner.

It is a further object of the invention to provide an improved construction of thermostatic expansible substance-working element which is not associated with the aforementioned drawbacks and limitations of the prior art constructions.

Now in order to implement these and still further objects of the invention which will become more readily apparent as the description proceeds the proposed thermostatic expansible substance-working element of the invention is manifested by the features that the expansible substance or material is a molded body which fills out the internal compartment of the housing and is predominantly formed of polytetrafluoroethylene, polytrifluoroethylene or polytetrafluoroethyleneperfluoropropylene.

It has been surprisingly found that such plastics possess a sufficient coefficient of expansion in order to be used as the expansible substance or material and furthermore with the pressures which develop in the housing are on the one hand sufficiently fluent or flowable in order to displace the piston like a fluid medium and, on the other hand, nonetheless maintain the properties of a solid body to such an extent that there does not occur a leakage or flowing-out through the gap which is present between the piston and the wall of the opening, even if such were not sealed.

As expansible substances there have already been proposed broadly plastics (yet for different type working elements), but not in the form of a molded body, that is to say, not as a massive component, rather always in a gelatinized suspension (e.g. U.S. Pat. 2,259,846 or German Pat. No. 1,266,017) or however plastics to which there is admixed a plasticizer in a quantity well exceeding the usual values, especially polyethylene (German Pat. No. 1,256,440).

With the proposed work or working element the length of the opening advantageously amounts to a multiple of its internal diameter, which in turn can surround with slight play the external diaimeter of the work piston. In this regard this play can be selected such that there can be totally dispensed with a particular sealing of the work piston with respect to the throughpassage opening in the housing.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE illustrates a longitudinal sectional view through a work or working element as contemplated by the invention.

DETAILED DESCRIPTION OF THE PREFERRED EMBODIMENTS

Describing now the drawing the exemplary illustrated work or working element 10 possesses an essentially cylindrical, elongated housing 11. This housing 11 is provided at its one end with a continuous opening 12 through which extends a work piston 13. The end of the work piston 13 appearing at the right-hand portion of the drawing is to be connected or coupled with the component to be moved (not shown in the drawing), e.g. the spindle of a valve, whereas the end of the work piston 13 appearing at the left-hand portion of the drawing, as indicated by reference character 14, is pointed and engages into the internal space or compartment 15 of the housing 11. This internal compartment 15 is filled with a molded body 16, for instance formed of polytetrafluoroethylene. At the end situated opposite the opening 12 the internal compartment 15 transforms into an internal threading 18 into which there can be screwed a threaded stopper or plug 17. Instead of the stopper 17 there can also be provided a smooth flanged plug or stopper.

At the outside of the housing 11 which is preferably formed of stainless steel there can be provided —to the extent that the working element requires an external heating— a heating coil 20 which is wound onto for instance an eloxadized Al-tube 19.

The assembly of the illustrated working element is extremely simple. If the heating coil or spiral 20 is not taken into account then the working element only consists of four components or parts. In the previously bored or drilled molded body 16 there is inserted the work piston 13, and then the molded body 16 with the work piston 13 leading is pushed into the housing 11 which is then closed by the threaded stopper or plug 17. By means of the threaded plug the molded body 16 is subjected to pressure to such an extent that it begins to flow and displaces any air which is still present in possible uneven portions in the internal compartment 15 of the housing 11 through the opening 12. Also by means of the stopper 17 it is possible to adjust the innermost position of the work piston 13. The play between the work piston 13 and the wall of the opening 12 can for instance correspond to a fit H7/g6, that is to say in a tolerance range which can be maintained quite easily with conventional lathes or drilling machines.

If the work element 10 is heated beyond the response temperature, whether such be by means of the heating coil 20 or by means of a fluid medium surrounding the work element, then the molded body 16 expands with the result that the work piston 13 is displaced. This displacement results in an axial shifting of the work piston 13 and this axial shifting or displacement is tapped-off at the end of the work piston which appears at the right-hand portion of the drawing. If the work element 10 is again cooled then a restoring force, for instance emanating from a spring (not shown), forces the piston back into its starting position.

Any comparison with the prior known similar type of species of working elements falls extremely to the advantage of the inventive working element. Since the sealing does not present any problem there can be employed on the one hand within the housing higher working pressures which —for the same stroke force— leads to a reduction in size of the working element. The smaller the size of the working element that much smaller is its total volume and accordingly also the response time. For the same reasons it is possible with the inventive working element to utilize higher working temperature ranges (this is especially the case for the embodiment with external heating) than with the conventional working elements. This again makes the working element less dependent upon the ambient temperature and also increases the response speed during the return stroke, since the temperature jump between the working temperature and the ambient temperature is considerably greater.

These quite considerable advantages of the inventive working element remain in existance even in comparison with working elements of a different species, namely those in which the expansible material is arranged in a space enclosed at all sides however limited by a bellows or diaphragm.

While there is shown and described present preferred embodiments of the invention, it is to be distinctly understood that the invention is not limited thereto but may be variously embodied and practiced within the scope of the following claims.

Accordingly, what is claimed:

1. A thermostatic expansible material-working element, comprising a housing having an opening and provided with an internal compartment, a molded body constituted by a thermally expansible non-elastomeric fluorinated hydrocarbon material located within said internal compartment of the housing, a substantially pin-shaped work piston which is pointed at one end, said work piston extending through said opening of the housing by means of its pointed end into the expansible material such that a portion of the circumference of the work piston and its pointed end are surrounded by the expansible material, said work piston, upon thermal expansion of the thermally expansible material, being squeezed by the expansible material and displaced by virtue of the squeezing action in a direction through said opening of the housing, said molded body predominantly being formed of a member selected from the group consisting essentially of polytetrafluoroethylene, polytrifluoroethylene and polytetrafluoroethyleneperfluoropropylene.

2. The working element as defined in claim 1, wherein the length of the opening is larger than its diameter which surrounds the work piston.

3. The working element as defined in claim 1, wherein the internal compartment of the housing at the end situated opposite said opening is bounded by a threaded stopper by means of which the molded body can be pre-biased.

4. The working element as defined in claim 1, wherein the work piston extends through the opening with a small play and without the use of any seal.

5. The thermostatic expansible material-working element as defined in claim 5, wherein said thermally expansible non-elastomeric fluorinated hydrocarbon material is a solid material possessing fluent properties.

6. The thermostatic expansible material-working element as defined in claim 5, wherein said housing is provided with means constraining the molded body against elongation.

7. A method of fabricating a thermostatic expansible material-working element, comprising the steps of:
 1. forming a housing having an internal compartment and open at both ends;
 2. forming a molded body of a thermally expansible non-elastomeric fluorinated hydrocarbon material;
 3. forming a lengthwise extending passageway in the molded body for receiving a pin-shaped work piston having opposed ends;
 4. inserting a part of a pin-shaped work piston with one end into the passageway of said molded body so that the circumference of at least said part of the pin-shaped work piston and its one end are surrounded by the molded body for exertion of a squeezing action thereupon;
 5. inserting the molded body together with the therein embedded work piston through one open end of the housing into the internal compartment thereof with the end of the work piston remote from said one end extending out of the other open end of the housing; and
 6. closing the one open end of the housing remote from the other end through which extends the work piston.

8. The method as defined in claim 8, including the step of closing said one open end of the housing by means of a plug, and exerting pressure upon the molded body by tightening the plug to cause the material of the molded body to begin to flow and to displace any air still present in the internal compartment of the housing through the other open end of the housing through which extends the work piston.

9. The method as defined in claim 3, including the step of utilizing a work piston having a pointed end defining said one end of the work piston inserted into said molded body.

* * * * *